US012563640B2

(12) United States Patent
Venkata et al.

(10) Patent No.: US 12,563,640 B2
(45) Date of Patent: Feb. 24, 2026

(54) ADJUSTING RADIO ACCESS NETWORK CONNECTIONS BASED ON COMMUNICATION FAILURES

(71) Applicant: GOOGLE LLC, Mountain View, CA (US)

(72) Inventors: Madhusudan Kinthada Venkata, San Diego, CA (US); Qin Zhang, Mountain View, CA (US); Siddharth Ray, Sunnyvale, CA (US); Jibing Wang, San Jose, CA (US); Shivank Nayak, Milpitas, CA (US)

(73) Assignee: GOOGLE LLC, Mountain View, CA (US)

( * ) Notice: Subject to any disclaimer, the term of this patent is extended or adjusted under 35 U.S.C. 154(b) by 362 days.

(21) Appl. No.: 17/927,189

(22) PCT Filed: May 28, 2020

(86) PCT No.: PCT/US2020/034963
§ 371 (c)(1),
(2) Date: Nov. 22, 2022

(87) PCT Pub. No.: WO2021/242247
PCT Pub. Date: Dec. 2, 2021

(65) Prior Publication Data
US 2023/0217541 A1 Jul. 6, 2023

(51) Int. Cl.
*H04W 4/00* (2018.01)
*H04W 76/15* (2018.01)
*H04W 76/34* (2018.01)
(52) U.S. Cl.
CPC ........... *H04W 76/34* (2018.02); *H04W 76/15* (2018.02)

(58) Field of Classification Search
CPC ..... H04W 76/34; H04W 76/15; H04W 76/16; H04W 76/19; Y02D 30/70
See application file for complete search history.

(56) References Cited

U.S. PATENT DOCUMENTS 10,455,629 B2     10/2019   Han et al.
10,681,565 B2 *    6/2020   Xu ........................ H04W 24/00
(Continued)

FOREIGN PATENT DOCUMENTS

CN     114765789 A   *   7/2022   ............ H04W 24/02
CN     117479186 A   *   1/2024   ........ H04W 28/0958
(Continued)

OTHER PUBLICATIONS

Communication pursuant to Article 94(3) EPC mailed Apr. 11, 2024 for EP Application No. 20744214.6, 8 pages.
(Continued)

*Primary Examiner* — Thai Dinh Hoang

(57) ABSTRACT
A user equipment (UE) reduces power consumption by selectively disconnecting from a radio access network (RAN) while in a non-standalone (NSA) mode in response to detecting a threshold number of communication failures associated with the RAN. The UE connects to a core network in the NSA mode via both a 4G RAN and a 5G RAN. The UE monitors the connection with the 5G RAN for communication failures, such as Random Access Channel (RACH) failures, radio link failures (RLFs), and the like. In response to the number of detected failures exceeding a threshold, the UE can determine that the quality of the connection with the 5G RAN is providing relatively little benefit and can terminate the connection with the 5G RAN.

20 Claims, 4 Drawing Sheets

(56) References Cited

U.S. PATENT DOCUMENTS

| | | | | |
|---|---|---|---|---|
| 11,589,406 | B2 * | 2/2023 | Venkatachari | H04L 1/0038 |
| 2015/0223282 | A1 | 8/2015 | Vajapeyam et al. | |
| 2016/0165432 | A1 * | 6/2016 | Dubesset | H04W 76/12 |
| | | | | 455/433 |
| 2018/0324853 | A1 * | 11/2018 | Jeon | H04W 74/006 |
| 2019/0089447 | A1 | 3/2019 | Sang et al. | |
| 2019/0104562 | A1 | 4/2019 | Tsai et al. | |
| 2020/0280901 | A1 * | 9/2020 | Na | H04W 40/12 |
| 2020/0383027 | A1 * | 12/2020 | Venkataraman | H04W 48/20 |
| 2021/0045177 | A1 * | 2/2021 | Lee | H04W 76/18 |
| 2021/0051651 | A1 * | 2/2021 | He | H04W 72/044 |
| 2021/0051748 | A1 * | 2/2021 | Xu | H04W 8/24 |
| 2021/0282211 | A1 * | 9/2021 | Pezeshki | H04W 76/19 |
| 2021/0307096 | A1 * | 9/2021 | Lee | H04W 76/18 |
| 2021/0329508 | A1 * | 10/2021 | Gopal | H04B 7/0602 |
| 2021/0329703 | A1 * | 10/2021 | Yang | H04B 17/318 |
| 2022/0167447 | A1 * | 5/2022 | Liu | H04L 43/065 |
| 2024/0284553 | A1 * | 8/2024 | Dai | H04W 76/19 |
| 2025/0031070 | A1 * | 1/2025 | Hirzallah | H04W 24/04 |

FOREIGN PATENT DOCUMENTS

| | | | | | |
|---|---|---|---|---|---|
| EP | 3592097 | A1 | | 1/2020 | |
| WO | WO-2013097063 | A1 | * | 7/2013 | H04W 36/324 |
| WO | 2014111499 | A1 | | 7/2014 | |
| WO | WO-2014181041 | A1 | * | 11/2014 | H04W 76/025 |
| WO | WO-2018190689 | A1 | * | 10/2018 | H04L 1/1628 |
| WO | 2019210957 | A1 | | 11/2019 | |
| WO | WO-2019245779 | A1 | * | 12/2019 | H04W 72/12 |
| WO | WO-2021207562 | A1 | * | 10/2021 | H04B 1/40 |
| WO | WO-2021217591 | A1 | * | 11/2021 | H04W 76/19 |

OTHER PUBLICATIONS

International Search Report and Written Opinion mailed Feb. 8, 2021 for corresponding International Application No. PCT/US2020/034963, 15 pages.

International Preliminary Report on Patentability mailed Dec. 8, 2022 for PCT Application No. PCT/US2020/034963, 8 pages.

Communication pursuant to Article 94(3) EPC mailed Dec. 12, 2025 for EP Application No. 20744214.6, 8 pages.

* cited by examiner

CORE
NETWORK
104

RADIO ACCESS
NETWORK (4G)
105

RADIO ACCESS
NETWORK (5G)
106

110

FAILURES

107

108

102

100

600

ADJUSTING RADIO ACCESS NETWORK CONNECTIONS BASED ON COMMUNICATION FAILURES

CROSS-REFERENCE TO RELATED APPLICATIONS

The present application is a U.S. National Stage under 35 U.S.C. § 371 of International Patent Application Serial No. PCT/US2020/034963, entitled "ADJUSTING RADIO ACCESS NETWORK CONNECTIONS BASED ON COMMUNICATION FAILURES" and filed on May 28, 2020, the entirety of which is incorporated by reference herein.

BACKGROUND

Network providers continue to enhance network infrastructure to provide improved bandwidth, communication reliability, and other network features. To support these enhanced features, network providers implement improved Radio Access Networks (RANs) that provide connections between user equipment (UE) and one or more core networks. An example of such an improved RAN is a fifth generation (5G) cellular network that supports improved bandwidth and other features via the implementation of higher frequency (e.g., microwave and millimeter wave (mmWave)) carrier waves (also referred to as carriers). However, these higher-frequency carriers can consume a relatively high amount of power at the UE, and can provide unstable communication under some conditions, such as when the waves are obstructed (e.g., when the UE is inside a building or tunnel) or when the UE is rapidly moving (e.g., when the UE is in a moving car).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
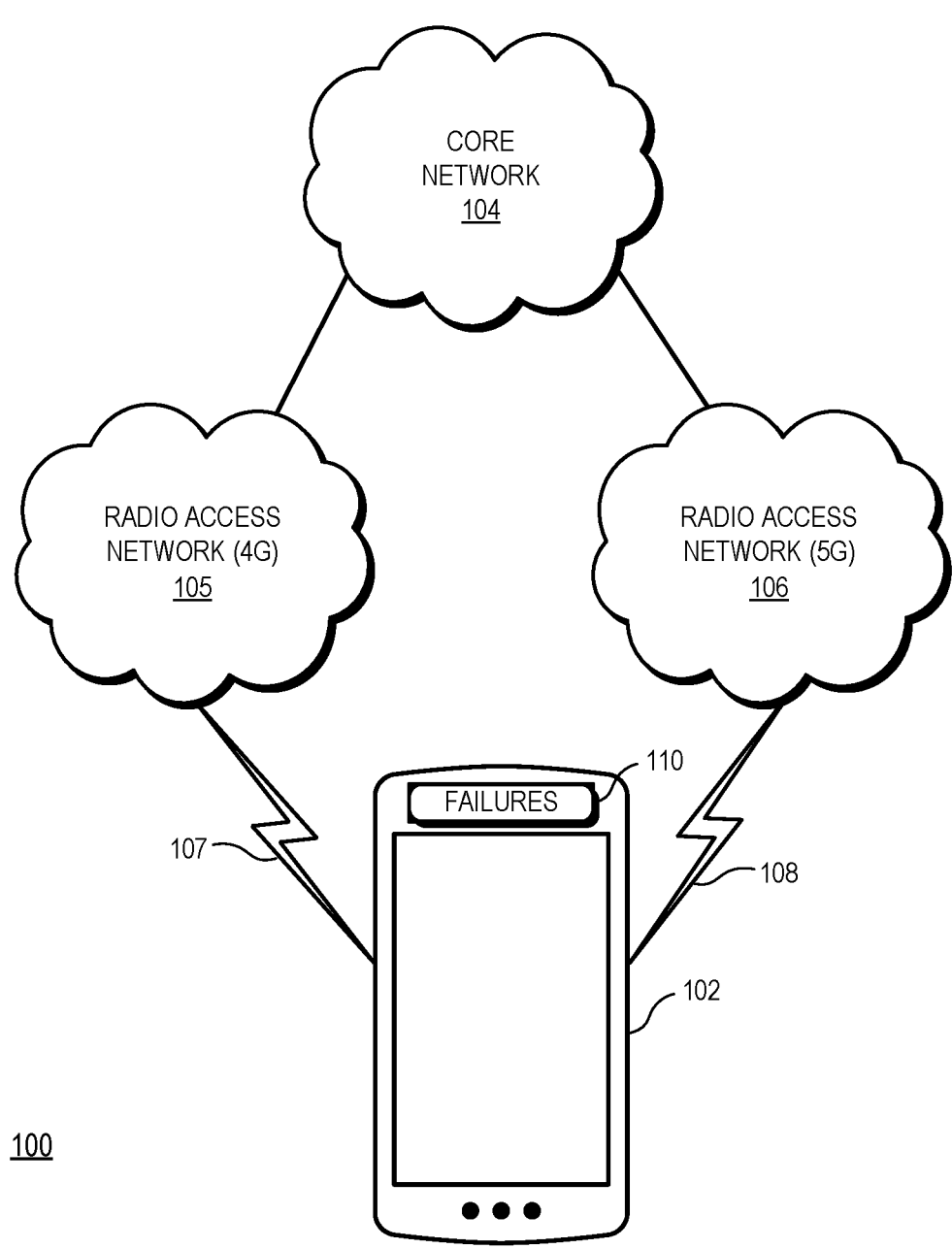
FIG. 1 is a block diagram of a communication network that supports adjusting connections between user equipment and a plurality of Radio Access Networks based on communication failures in accordance with some embodiments.

To support increased bandwidth and reliable communication, some UE operate in a non-standalone (NSA) mode, wherein the UE connects to a core network via multiple RANs employing different radio access technologies. However, under some conditions the quality of connection to a given one of the RANs does not warrant the additional power consumption required for the connection to the given RAN. For example, a UE can concurrently connect to the core network via a 4G RAN (that is, a RAN that employs a 4G radio access technology (RAT)) using 4G carriers (or carrier waves), and via a 5G RAN (a RAN that employs a 5G RAT) using 5G carriers (or carrier waves). However, the connection to the 5G RAN can consume a relatively large amount of UE power, and under some conditions the 5G connection may experience communication failures that reduce or limit the amount of additional bandwidth provided by the 5G connection.

Disclosed herein are techniques for reducing power consumption at the UE by selectively disconnecting from a RAN while in the NSA mode in response to detecting a threshold number of communication failures associated with the RAN. The UE can connect to a core network in the NSA mode via both a first RAN (for example, a 5G RAN) and a second RAN (for example, a 4G RAN). The UE monitors the connection with the first RAN (here the 5G RAN) for communication failures, such as Random Access Channel (RACH) failures, radio link failures (RLFs), and the like, or a combination thereof. In some cases, these communication failures are associated with the carrier waves or carriers connecting the UE to the 5G RAN. In response to the number of detected failures exceeding a threshold, the UE can determine that the quality of the connection with the 5G network is providing relatively little benefit and can terminate (or disable) the connection with the 5G RAN. The UE thereby reduces power consumption without reducing communication bandwidth or otherwise negatively impacting the user experience.

The UE can connect to a core network in the NSA mode via a first RAN (employing a first RAT, such as 4G or 5G) and via a second RAN (employing a second RAT, such as 4G or 5G); the UE can connect to multiple 4G RAN, or to multiple 5G RAN, or to a combination therefore, or to any other suitable RAN. The UE is connected to the respective RAN via respective carrier waves, or carriers. In response to detecting that a first number of communication failures associated with (carriers of) the first RAN exceeds a threshold, the UE disables or terminates the connection with the first RAN. In some examples, the first RAN employs higher wireless carrier frequencies than the second RAN. Communication over these first, higher frequency, carriers can require the UE to consume more power than communication over the second, lower frequency, carriers associated with the second RAN. The first carriers may also be more unreliable, resulting in a large number of the communication failures. By disabling the connection to the first RAN whilst maintaining communications via the second RAN, the UE thereby reduces power consumption without reducing communication bandwidth. In other examples where the first and second RANs employ the same frequencies, or the first RAN uses lower frequency carriers than the second RAN, disabling the connection to the first RAN when the communication failures exceed a threshold can also reduce power consumption (by not maintaining an unreliable connection) without reducing communication bandwidth (since communications can be via the more reliable second RAN).

The UE can connect to a core network via a first set of carriers associated with a first radio access technology (RAT, optionally 5G) and a second set of carriers associated with a second RAT (optionally 4G). In response to identifying that a first number of communication failures associated with the first set of carriers exceeds a first threshold, the US can disable the connection via the first set of carriers. The UE can then communication with the core network via the second set of carriers after the disabling. In some examples, the first RAT employs higher wireless carrier frequencies than the second RAT. Communication using these first, higher frequency, carriers can require the UE to consume more power than communication over the second, lower frequency, carriers associated with the second RAT. By disabling the connection via the first set of carriers whilst maintaining the connection via the second carriers, the UE thereby reduces power consumption without reducing communication bandwidth.

In some embodiments, the UE maintains a data structure, such as a table, of failures associated with different network cells, different geographical locations, or a combination thereof. As the user moves between, for example, the different network cells, the UE employs the table to identify an aggregate number of (communication) failures associated with each cell. In response to the aggregate number of failures for a given network cell exceeding a corresponding threshold, the UE terminates or suppresses connection with the first (for example, 5G) RAN while located within the given network cell. The UE can thereby tailor the number of connections to different RANs based on the quality of connection associated with each network cell, thereby reducing overall power consumption at the UE, improving battery life and the overall user experience.

FIG. 1 illustrates a communication network 100 that supports termination or disabling of connection to a RAN based on a number of communication failures associated with carriers of the RAN in accordance with some embodiments. In the illustrated example, the communication network 100 includes a UE 102, a core network 104, and RANs 105 and 106. The UE 102 is illustrated as a smartphone, but in other embodiments can be any device including a network interface or other device that supports connection to multiple RANs. For example, in some embodiments the UE 102 is a smartphone that includes a network interface that can operate in one of two modes: a standalone (SA) mode, wherein the UE 102 connects to only one RAN, and a non-standalone (NSA) mode wherein the UE 102 concurrently connects to both the RANs 105 and 106, as described further herein.

The core network 104 is a network that provides communication services for the UE 102, such as aggregation services, authentication services, call control and switching, service invocation and charging services, and the like. In some embodiments, the core network 104 can also provide a gateway for the UE 102 to communicate with other networks, such as the Internet. In the example of FIG. 1, the RANs 105 and 106 each connect the UE 102 to the same core network 104. However, in other embodiments, the RANs 105 and 106 can each be associated with a different core network, such as separate 4G and 5G core networks. In still other embodiments, the different core networks are not entirely separate, but instead share some aspects or network equipment.

The RANs 105 and 106 are Radio Access Networks that each connect the UE 102 to the core network 104 according to the specifications of a corresponding Radio Access Technology (RAT). In the depicted example, the RAN 105 is an access network that complies with a Fourth Generation (4G) wireless communication protocol, and accordingly includes network equipment to support connection of the UE 102 to the core network 104 according to the 4G protocol, including one or more Evolved NodeB (eNB) devices, one or more Mobile Management Entity (MME) devices, and the like. The UE connects to the RAN 105 via one or more carriers 107, wherein the frequency of the carriers 107 is specified by the network protocol of the RAN 105.

The RAN 106 is an access network that complies with a Fifth Generation (5G) wireless communication protocol, and therefore includes network equipment to support connection of the UE 102 to the core network 104 according to the 5G protocol, including one or more Next Generation NodeB (gNB) devices. The UE connects to the RAN 106 via one or more carriers 108, wherein the frequency of the carriers 108 is specified by the network protocol of the RAN 106. In at least some embodiments, the frequency or frequencies of the carriers 108 differs from the frequency or frequencies of the carriers 107.

As noted above, in some embodiments the UE 102 can operate in an NSA mode, wherein a network interface of the UE 102 concurrently connects to both the RAN 105 and the RAN 106. In some embodiments, in the NSA mode, the UE 102 and the core network 104 communicate different types of information via the different RANs 105 and 106. For example, in some embodiments the RAN 105 can have greater reliability, and all or most control plane information is communicated between the UE 102 and the core network 104 via the RAN 105. In contrast, the RAN 106 can support greater bandwidth, and therefore all or most user plane data (e.g., data associated with applications employed by the user of the UE 102) is communicated between the UE 102 and the core network 104 via the RAN 106.

In some embodiments, the RAN 106 employs relatively high wireless carrier frequencies to support a high communication bandwidth between the UE 102 and the core network 104. However, these high-frequency carriers can require the UE 102 to consume a relatively large amount of power. In addition, under some conditions the communications over such high-frequency carriers can be unreliable, resulting in a large number of the communication failures. Thus, in some cases, such as when the UE is in a rapidly moving vehicle or in a (geographical) location that is obstructed from reliable transmission or reception of the high-frequency carriers (e.g., in a tunnel or an internal room of a building), the connection to the RAN 106 may provide relatively little benefit due to the high number of communication failures, while still consuming a large amount of power at the UE 102. Accordingly, the UE 102 monitors a number of (communication) failures 110 associated with the connection to the RAN 106 (i.e. associated with the set of carriers for connecting UE 102 to RAN 106). In response to the number of failures exceeding a threshold, the UE 102 can terminate the connection with the RAN 106, and enter the SA mode, wherein the UE 102 communicates with the core network 104 via only the RAN 105.

The type of the failures 110 can vary in different embodiments. For example, in some embodiments, prior to communicating data via the RAN 106 or under other specified conditions, the UE 102 conducts a Random Access Channel (RACH) process whereby the UE 102 attempts to synchronize with the RAN 106. During the RACH process, the UE sends one or more messages to a gNB of the RAN 106 and awaits an expected response. When the expected response is not received, or when a response of a specified type is received, the UE 102 can identify a RACH failure, and accordingly increment the value of the failures 110.

For example, in some embodiments the UE 102 initiates the RACH process by sending a RACH preamble, in a specified preamble format associated with the RAN 106, to the gNB via a physical RACH (PRACH) channel. If a specified Random Access Response (RAR) message to the RACH preamble is not received from the gNB within a specified amount of time, the UE 102 can identify a RACH failure and increment the number of failures 110. In some embodiments, in response to not receiving an RAR message responsive to the RACH preamble, the UE 102 retransmits the RACH preamble to the gNB. The UE 102 identifies a RACH failure in response to a threshold number of retransmissions of the RACH preamble without receiving a responsive RAR message.

In some embodiments, responsive to receiving the RAR message, the UE 102 continues the RACH process by communicating additional RACH messages, with corresponding expected responses. The UE 102 can identify a RACH failure responsive to a failure to receive an expected response to any of the RACH messages within a threshold amount of time, responsive to a specified number of threshold retransmissions of one or more RACH messages, or any combination thereof. For example, in some embodiments, responsive to receiving a RAR messages, the UE 102 sends a Radio Resource Control (RRC) connection message the gNB and awaits a responsive acknowledgement message from the gNB. The UE 102 retransmits the RRC connection message in response to not receiving the acknowledgement message and identifies a RACH failure in response to a threshold number of retransmissions of the RRC connection message.

In some embodiments, the UE 102 can identify a RACH failure based on a message received from the gNB. For example, in some cases the UE 102 can contend for a channel of the gNB with another UE. The gNB can indicate to the UE 102, via a specified message or message field, that the UE 102 has "lost" the contention process to the other UE and has not been assigned the requested channel. In response to the contention loss, the UE 102 can identify a RACH failure. In some embodiments, the UE 102 can identify a failure in response to other Radio Link (RL) failure indicators such as a radio resource configuration mismatch, a cell handover failure, poor radio signal quality, and the like.

In response to the value (or number) of the failures 110 exceeding a threshold, the UE 102 enters an SA mode wherein the UE 102 is connected to the core network 104 only via the RAN 105, and any connection to the RAN 106 is terminated by the UE 102. The threshold is a predetermined threshold, and in some examples is a programmable value. In some embodiments, the UE 102 enters the SA mode by sending one or more termination messages to a gNB of the RAN 106. In some embodiments, the UE can return to the NSA mode, and reestablish connection with the RAN 106 in response to one or more specified conditions, such as expiration of a specified amount of time, a power cycling or re-boot of the UE 102 (e.g., the UE 102 being powered down and subsequently powered on), responsive to a request from an application, responsive to the user adjusting settings of the UE 102, and the like, or any combination thereof.

Figure 2:
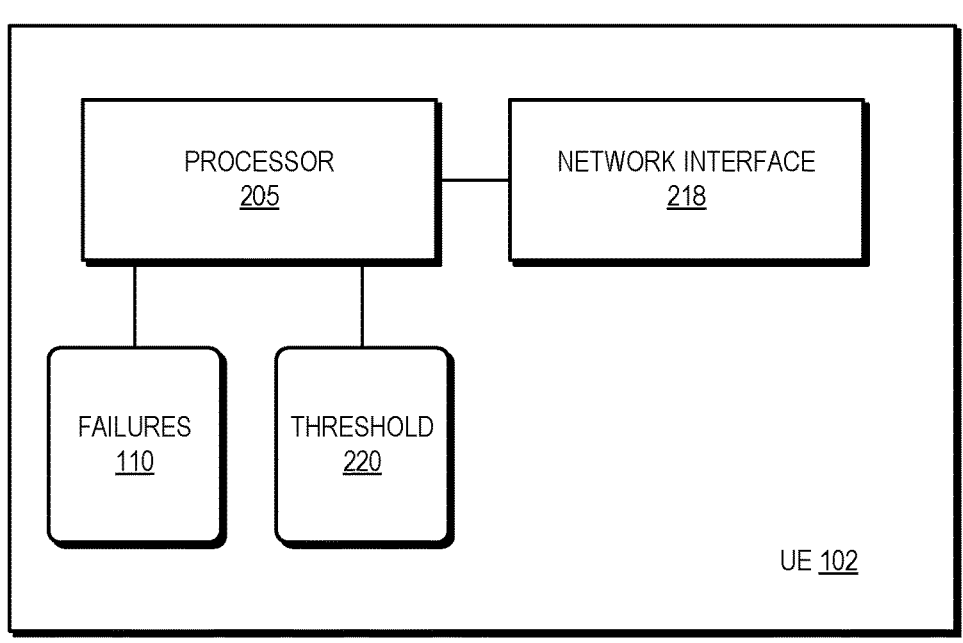
FIG. 2 is a block diagram of the UE of FIG. 1 storing an indication of communication failures associated with a RAN in accordance with some embodiments.

FIG. 2 illustrates a block diagram of the UE 102 in accordance with some embodiments. In the illustrated example, the UE 102 includes a processor 205 and a network interface 218. In some embodiments, the processor 205 is a baseband processor generally configured to manage the radio functions of the UE 102, while the network interface 218 represents at least a physical (PHY) layer controlled by the processor 205. In some embodiments, the processor 205 can interface with other processors (not shown) of the UE 102. For example, in some embodiments the UE 102 includes one or more application processors configured to execute applications (e.g., an operating system) on behalf of the UE 102. The processor 205 and the network interface 218 together provide an interface to the core network 104 for the applications executing on the one or more application processors.

In operation, the network interface 218 responds to commands from the processor 205 to establish connections to the RAN 105 and RAN 106 of FIG. 1. For example, in some embodiments the processor 205 controls the devices of the network interface 218 to conduct RACH processes for each of the RANs 105 and 106, and, upon establishing a RACH for each network, uses the devices of the network interface 218 to send and receive data to one or more of the RANs 105 and 106.

The processor 205 can operate in either the NSA mode, wherein the processor 205 establishes and maintains connections with each of the RANs 105 and 106, and in the SA mode, wherein the processor 205 establishes and maintains a connection with only the RAN 105. While in the NSA mode, the network interface 218 can indicate communication failures, such as RACH failures, RL failures, and the like, or any combination thereof, to the processor 205. For example, in some embodiments the network interface 218 maintains a counter that stores a number of retransmissions of a RACH preamble to a gNB of the RAN 106. In response to the value stored at the counter exceeding a threshold, the network interface 218 indicates a communication failure to the processor 205.

The processor 205 maintains the failures 110 based on communication failures indicated by the network interface 218. For example, in some embodiments the failures 110 indicates the aggregate number of communication failures indicated by the network interface 218 over a specified amount of time. The processor 205 can reset the failures 110 to an initial value (e.g., zero) in response to one or more specified conditions, such as expiration of a specified amount of time, the UE 102 changing cells associated with the RAN 106, in response to a request or command from an operating system executing at the application processor, and the like, or any combination thereof.

The processor 205 also maintains a threshold 220 that is a value indicating a threshold number of communication failures. In some embodiments, the threshold 220 is a programmable or configurable value that reflects a quality of service (QoS) level for the RAN 106. For example, in some embodiments the threshold 220 is configured to a value at or near a level wherein the corresponding number of communication failures indicate that the actual communication bandwidth between the UE 102 and the RAN 106 is relatively lower, and therefore the power consumed at the UE 102 by the connection to the RAN 106 is not warranted (e.g., does not provide a noticeable benefit to the user of the UE 102).

In operation, while in the NSA mode the processor 205 adjusts the failures 110 based on communication failures indicated by the network interface 218. In response to the failures 110 exceeding the threshold 220, the processor 205 exits the NSA mode and enters the SA mode. In particular, the processor 205 sends one or more connection termination messages to the RAN 106 via the network interface 218, thereby terminating the network connection. For subsequent data to be communicated to the core network 104, and until the processor 205 receives instructions (e.g., from an operating system executing at the application processor) to re-enter the NSA mode, the processor 205 employs only the connection with RAN 105. The UE 102 thereby conserves power when the quality of the connection with the RAN 106 is relatively poor.

Figure 3:
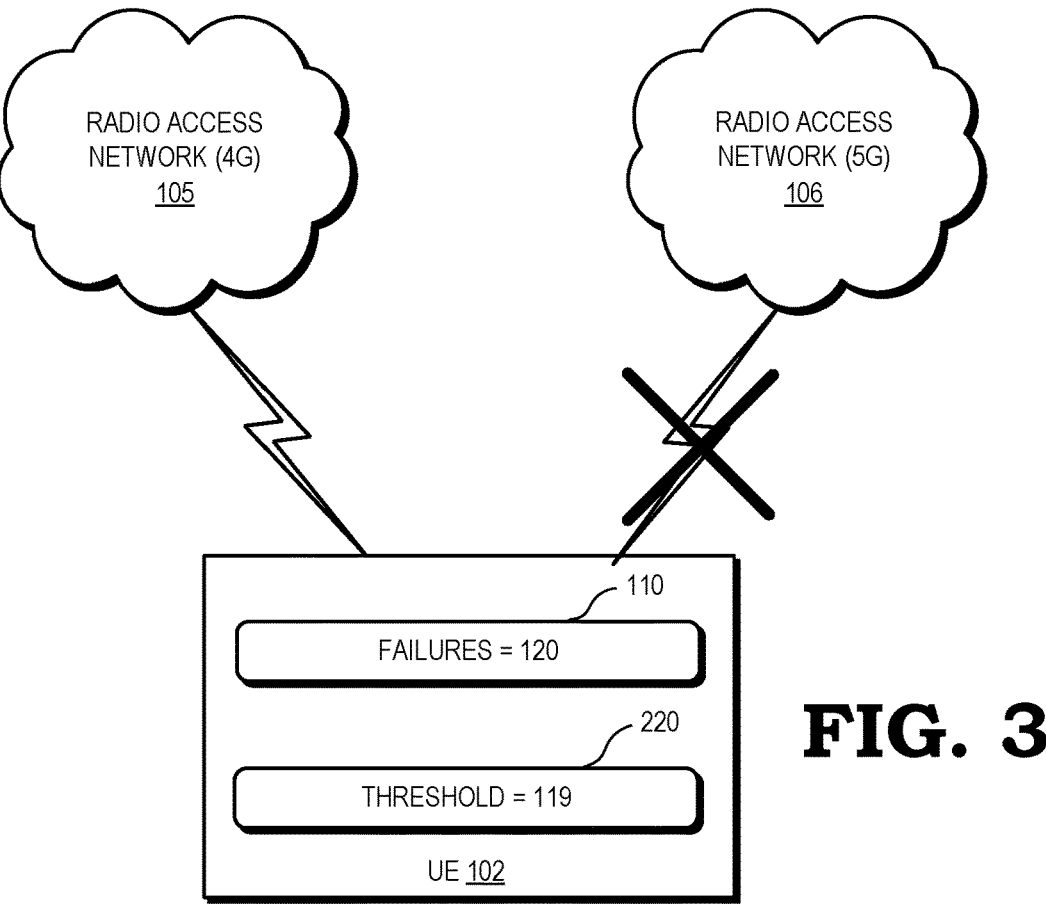
FIG. 3 is a block diagram illustrating an example of the UE of FIG. 1 terminating connection to a RAN in response to detecting a threshold number of communication failures in accordance with some embodiments.

FIG. 3 illustrates an example of the UE 102 terminating connection with the RAN 106 in response to the threshold 220 being exceeded by the value of the failures 110. The UE 102 is initially operating in the NSA mode, and has therefore established connection with both the RAN 105 and the RAN 106. In the depicted example, the processor 205 has identified, based on indications received from the network interface 118, that there have been 120 communication failures with the RAN 106. In addition, for the example of FIG. 3, the threshold 220 has been set to 119 communication failures. Accordingly, the processor 205 determines that the value of the failures 110 (i.e. the value of 120 communication failures) exceeds the threshold 220. In response, the processor 205 exits the NSA mode and enters the SA mode by terminating the connection with the RAN 106.

Figure 4:
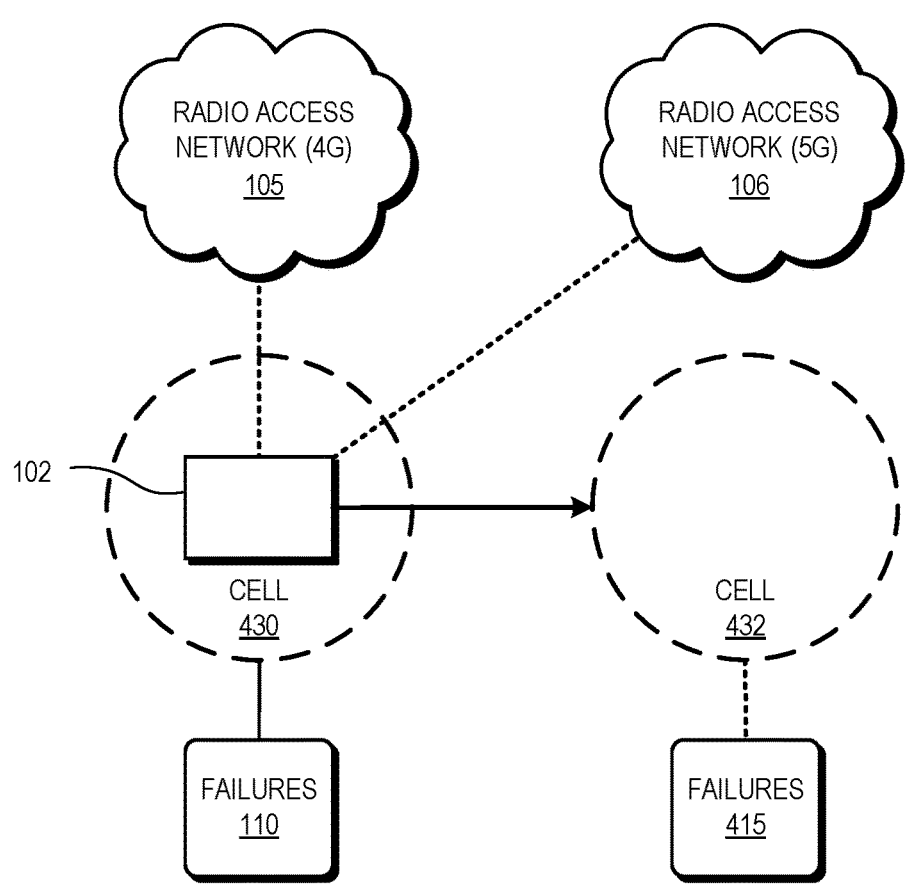
FIG. 4 is a block diagram illustrating the UE of FIG. 1 maintaining different communication failure counts for different locations or cells in accordance with some embodiments.

In some cases, the quality of the connection with the RAN 106 varies based on the location of the UE 102. For example, a given location may have a relatively high number of transmission obstructions (e.g., walls) between the UE 102 and the gNB of the RAN 106 to which the UE 102 is connected, resulting in a relatively poor connection and a higher number of communication failures, while another location may have fewer transmission obstructions and a lower number of resulting communication failures. Accordingly, in some embodiments, the UE 102 maintains different counts of failures for different (geographical) locations of the UE 102. The UE 102 can thereby tailor use of the NSA mode based on the relative quality of the connections for different locations, reducing overall power consumption and improving the user experience. An example is illustrated at FIG. 4 in accordance with some embodiments. The location of the UE 102 may be determined in any suitable manner; when the specific location of the UE is within a predetermined distance from a given point or location, or within a specified area around the given point or location (for example), the UE can be considered within the given location.

In the example of FIG. 4, the RAN 106 includes multiple cells, with each cell corresponding to a different geographical area. In some embodiments, each cell includes its own gNB, while in other embodiments, a single gNB of the RAN 106 services multiple cells, with each cell associated with its own transceiver, or set of transceivers, of the RAN 106. The UE 102 can move between the cells of the RAN 106, with the RAN 106 and the UE 102 maintaining connection via a specified cell handover process.

In the depicted example of FIG. 4, the RAN 106 includes at least two cells, designated cell 430 and 432 respectively. The UE 102 maintains different counts of failures associated with the cells 430 and 432, wherein the respective counts are designated failures 110 and failures 415. Thus, in response to identifying a communication failure while the UE is connected to the RAN 106 via the cell 430, the processor 205 increments the value of the failures 110. Similarly, in response to identifying a communication failure while the UE 102 is connected to the RAN 106 via the cell 432, the processor 205 increments the value of the failures 415. In response to the value of one of the failures 110 and failures 415 exceeding the threshold 220, the UE 102 can enter the SA mode and terminate the connection with the RAN 106, at least while the UE 102 is located within the corresponding cell.

For example, in some cases the value of the failures 110 is below the threshold 120 and the value of the failures 415 exceeds the threshold 120. In response, the UE 102 maintains the SA mode while located within the (area covered by) cell 432 and maintains the NSA mode while located in the cell 430. During the cell handover process, the UE 102 can determine whether the value or number of the failures associated with the carriers for the cell being entered exceeds the threshold 220 and set the operating mode to the NSA mode or the SA mode accordingly. For example, if the value of the failures for the cell being entered exceeds the threshold 220, the UE 102 sets the operating mode to the SA mode and connects only to the RAN 105, and does not connect to the RAN 106 as a result of the cell handover.

In some embodiments, the UE 102 can maintain the value of the failures for a cell, at least for a time, after the UE 102 has exited the cell, and can resume adjustment of the failures value when the UE 102 re-enters the cell. For example, the UE 102 can be located in cell 430 for a given amount of time and detect N communication failures associated with the RAN 106 before exiting the cell 430 and entering the cell 432, where N is an integer. Accordingly, the value of the failures 110 when the UE 102 exits the cell 430 is N. While the UE 102 is located within the cell 432, the UE 102 maintains the value N. When the UE 102 re-enters the cell 430 from the cell 432, the UE 102 can continue to adjust the value of the failures 110, staring at the value N.

Thus, the failures 110 can represent an aggregate number of communication failures for the cell 430 across different connection sessions associated with the cell, distributed over time. This allows the UE 102 to maintain failure counts and terminate the NSA mode for a cell with poor connection quality, even when the UE 102 is frequently moving between or among different cells.

In some embodiments, the UE 102 associates different failure values with different geographical locations that do not correspond to a particular cell of the RAN 106. For example, in some embodiments the UE 102 can associate different failure values with different geographical locations based on Global Positioning System (GPS) information generated or received at the UE 102.

Figure 5:
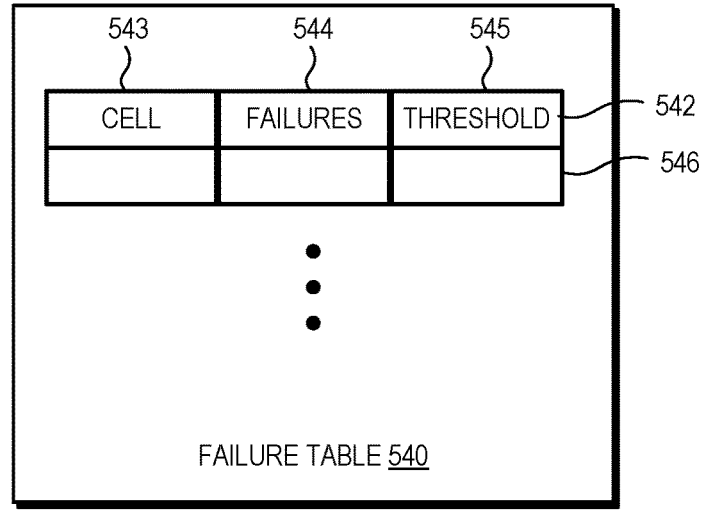
FIG. 5 is a diagram illustrating an example of a failure table maintained by the UE of FIG. 1 to monitor failures associated with different locations or cells in accordance with some embodiments.

To store different failure values for different locations, the UE 102 can employ a data structure having multiple entries, such as a table, with each entry corresponding to a different location. An example is illustrated at FIG. 5 in accordance with some embodiments. In particular, FIG. 5 illustrates a failures table 540 that can be maintained by the UE 102 in some embodiments. The failures table 540 includes a plurality of entries, such as entries 542 and 546.

Each entry of the failures table 540 includes a plurality of fields, including a cell field 543, a failures field 544, and a threshold field 545. The cell field 543 stores an identifier for the network cell associated with the entry. The failures field 544 stores the number of communication failures associated with the cell identified in the cell field 543. The threshold field 545 stores the failure threshold for the cell identified in the cell field 543. In some embodiments, the threshold field 545 can store different values for different cells, allowing the UE 102 to apply, for different cells, different communication failure thresholds that trigger exiting the NSA mode. In some examples, the failures table 540 stores a number of communication failures associated with different geographic locations.

In operation, when the UE 102 detects a communication failure while in a given cell, the UE 102 determines, based on the cell field 543, the entry of the failure table 540 corresponding to the given cell. The UE 102 adjusts (e.g., increments) the value stored at the failures field 544 of the identified entry. The UE 102 compares the adjusted value at the failures field 544 and determines if the adjusted value exceeds the threshold stored at the threshold field 545 of the identified entry. In response to the number of communication failures exceeding the threshold, the UE 102 exits the NSA mode and enter the SA mode, thereby terminating the connection with the RAN 106.

In some embodiments, the UE 102 can traverse a large number of cells over time. In order to keep the number of entries of the failures table 540 relatively small, the UE 102 can implement the failures table 540 as a ring buffer. As the UE 102 is handed over to a cell that does not have an associated entry of the failures table 540, the UE 102 selects an oldest entry and replaces the selected entry with an entry for the new cell.

In some embodiments, the failures table 540, or the information associated therewith, is used to train a machine learning (ML) model, such as a neural network. For example, the weights and other characteristics of the neural network can be adjusted during a training process that employs the information associated with the failures table 540 as inputs. The neural network or other ML model is thereby trained to predict expected failures for each of a plurality of different network cells. Based on these predictions, the UE can selectively enter or exit the NSA mode as described herein.

Figure 6:
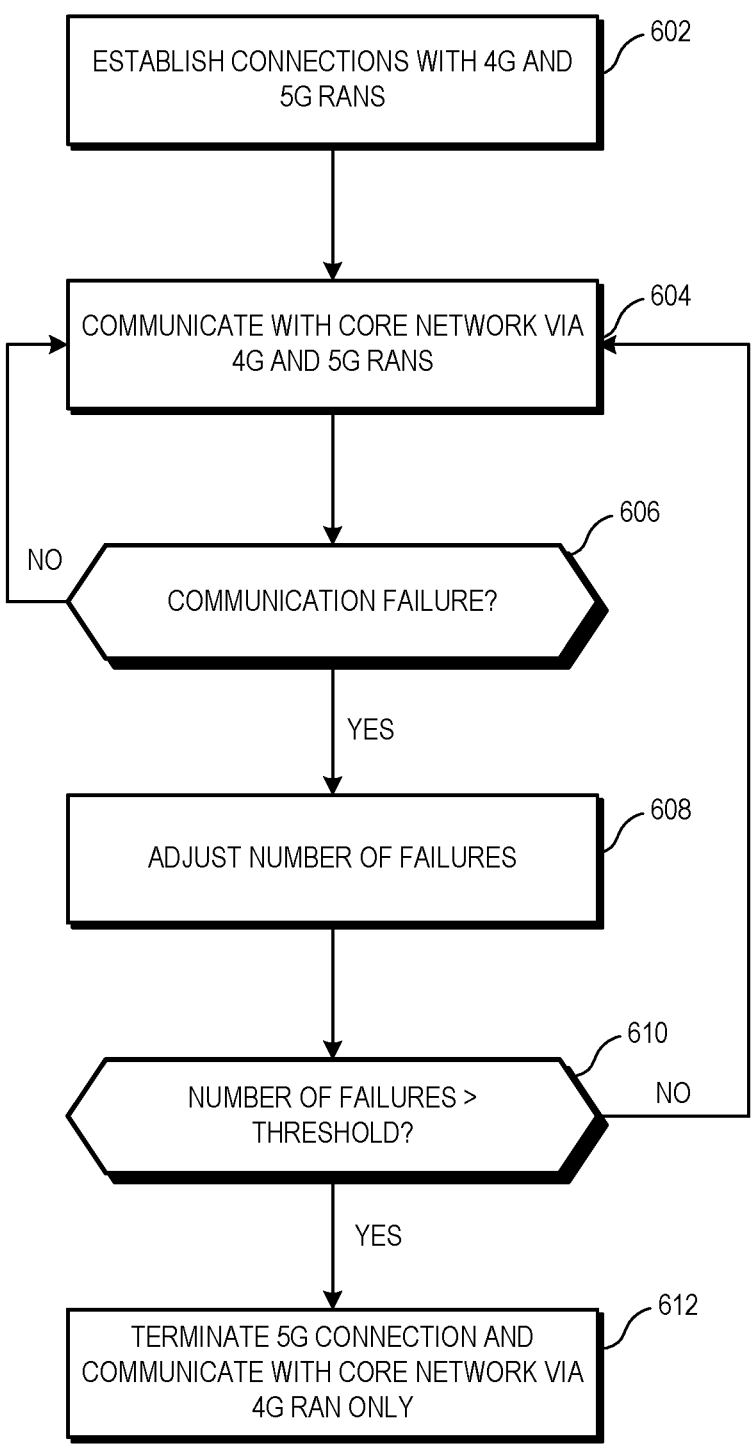
FIG. 6 is a flow diagram of a method of adjusting connections to one or more RANs based on communication failures associated with the one or more RANs in accordance with some embodiments.

FIG. 6 illustrates a flow diagram of a method 600 of a method of adjusting connections to one or more RANs based on communication failures associated with the one or more RANs in accordance with some embodiments. The method 600 is described with respect to an example implementation at the communication network 100 of FIG. 1. At block 602, the UE 102 operates in NSA mode, and therefore establishes concurrent connections with both the RAN 105 and the RAN 106. At block 604, the UE 102 communicates with the core network 104 via one or both of the RAN 105 and the RAN 106. For example, in some embodiments the UE 102 communicates (i.e., sends, receives, or both sends and receives) control plane information via the RAN 105 and communicates user plane information via the RAN 106. In other embodiments, the UE 102 communicates user plane information via both the RAN 105 and the RAN 106.

At block 606, the UE 102 determines if a communication failure associated with the (carriers of) RAN 106 has occurred, such as a RACH failure or an RL failure. In some embodiments, the UE 102 identifies a communication failure based on the UE 102 not receiving an expected communication, such as an acknowledgement message, from the RAN 106 within and expected amount of time. In some embodiments, the UE 102 identifies a communication failure based on retransmitting a specified message to the RAN 106 a threshold number of times. If the UE 102 does not detect a communication failure, the method returns to block 604 and the UE 102 remains in the NSA mode and continues to communicate with the core network 104 via both the RAN 105 and the RAN 106.

In response to detecting a communication failure at block 606, the method flow moves to block 608 and the UE 102 adjusts (e.g., increments or decrements) a counter storing a value indicative of the number of communication failures associated with the RAN 106. At block 610, the UE 102 determines if the number of communication failures associated with the RAN 106 exceeds a threshold value. If not, the method flow returns to block 604 and the UE 102 remains in the NSA mode and continues to communicate with the core network 104 via both the RAN 105 and the RAN 106. If, at block 610, the UE 102 determines that the number of communication failures associated with the RAN 106 exceeds the threshold value, the method flow moves to block 612 and the UE 102 transitions to the SA mode. The UE 102 therefore terminates the connection with the RAN 106 and communicates with the core network 104 only via the RAN 105.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
connecting a user equipment (UE) to a first Radio Access Network (RAN) via a first set of carriers;
connecting the UE to a second RAN via a second set of carriers;
maintaining a plurality of counts of communication failures associated with the first set of carriers, each count of the plurality of counts associated with a different location;
incrementing a first count of the plurality of counts in response to detecting a communication failure when the UE is at a location corresponding to the first count;
in response to the first count exceeding a first threshold, disabling the UE's connection with the first RAN; and
communicating with a core network via the second RAN after disabling the first RAN.

2. The method of claim 1, wherein the first count comprises Random Access Channel (RACH) failures.

3. The method of claim 1, wherein the first count comprises radio link failures (RLFs).

4. The method of claim 1, wherein disabling the UE's connection with the first RAN includes entering, by the UE, a standalone mode.

5. The method of claim 4, further comprising:
incrementing a second count of the plurality of counts in response to detecting a communication failure when the UE is at a location corresponding to the second count; and
in response to the second count exceeding a second threshold, disabling the UE's connection with the first RAN.

6. The method of claim 5, further comprising:
maintaining a table of communication failures associated with the first RAN, each entry of the table storing a count of the plurality of counts and storing a corresponding threshold.

7. The method of claim 1, wherein the first threshold is associated with a first communication cell and further comprising:
incrementing the first count further in response to detecting a communication failure when the UE is connected to the first communication cell.

8. The method of claim 7, further comprising:
incrementing a second count of the plurality of counts in response to detecting a communication failure when the UE is connected to a second communication cell; and
in response to the second count exceeding a second threshold, disabling the UE's connection with the first RAN.

9. A method comprising:
concurrently connecting a user equipment (UE) to a core network via a first set of carriers associated with a first radio access technology (RAT) and a second set of carriers associated with a second RAT;
maintaining a plurality of counts of communication failures associated with a first set of carriers, each count of the plurality of counts associated with a different location;

incrementing a first count of the plurality of counts in response to detecting a communication failure when the UE is at a location corresponding to the first count;
in response to the first count exceeding a first threshold, disabling the UE's connection via the first set of carriers; and
communicating with the core network via the second set of carriers after the disabling.

10. The method of claim 9, wherein the first count comprises Random Access Channel (RACH) failures.

11. The method of claim 9, wherein the first count comprises radio link failures (RLFs).

12. The method of claim 9, wherein the first RAT comprises a 5G RAT and the second RAT comprises a 4G RAT.

13. The method of claim 9, wherein the first threshold is a programmable value.

14. A user equipment (UE) comprising:
a network interface configured to connect the UE to a first Radio Access Network (RAN) via a first set of carriers and to connect the UE to a second RAN via a second set of carriers;
a processor configured to:
maintain a plurality of counts of communication failures associated with a first set of carriers, each count of the plurality of counts associated with a different location;
increment a first count of the plurality of counts in response to detecting a communication failure when the UE is at a location corresponding to the first count;
in response to the first count exceeding a first threshold, disable the UE's connection with the first RAN; and
communicate with a core network via the second RAN after disabling the first RAN.

15. The UE of claim 14, wherein the first count comprises Random Access Channel (RACH) failures.

16. The UE of claim 14, wherein the first count comprises radio link failures (RLFs).

17. The UE of claim 14, further configured to:
in response to the first count exceeding a first threshold, enter a standalone mode.

18. The UE of claim 17, wherein the processor is configured to:
increment a second count of the plurality of counts in response to detecting a communication failure when the UE is at a location corresponding to the second count; and
in response to the second count exceeding a second threshold, disable the UE's connection with the first RAN.

19. The UE of claim 18, wherein the processor is configured to:
maintain a table of communication failures associated with the first RAN, each entry of the table storing a count of the plurality of counts and storing a corresponding threshold.

20. The UE of claim 14, wherein the first threshold is associated with a first communication cell, and wherein the processor is configured to:
increment the first count further in response to detecting a communication failure when the UE is connected to the first communication cell.

* * * * *